Aug. 9, 1960 S. AMUNDSEN 2,948,239
CORN PLANTER
Filed Dec. 29, 1955 3 Sheets-Sheet 1

INVENTOR.
Sverre Amundsen
BY
ATTORNEY

Aug. 9, 1960 S. AMUNDSEN 2,948,239
CORN PLANTER

Filed Dec. 29, 1955 3 Sheets-Sheet 2

INVENTOR.
Sverre Amundsen
BY
Sam J. Slotsky
ATTORNEY

Aug. 9, 1960    S. AMUNDSEN    2,948,239
CORN PLANTER
Filed Dec. 29, 1955    3 Sheets-Sheet 3
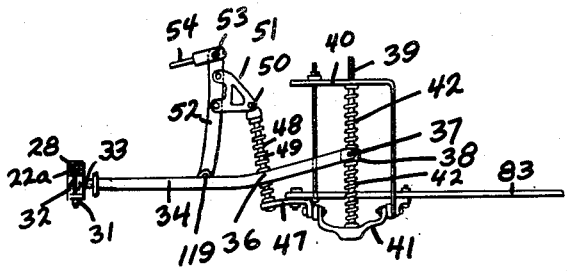
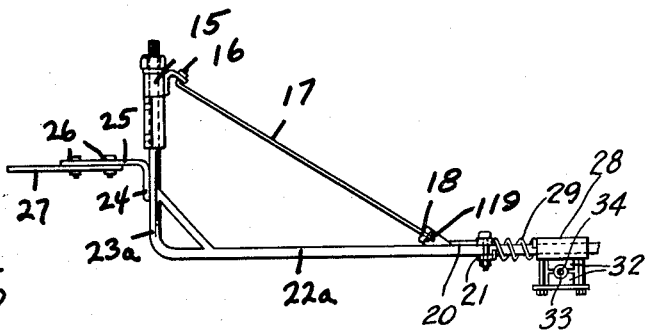
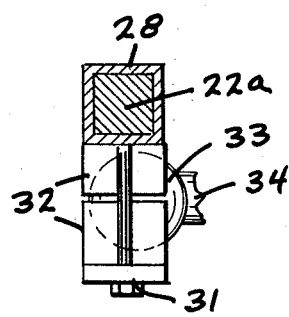
INVENTOR.
Sverre Amundsen
BY
*Sam J. Slotky*
ATTORNEY

United States Patent Office 2,948,239
Patented Aug. 9, 1960

2,948,239

CORN PLANTER

Sverre Amundsen, 414 Benson Bldg., Sioux City, Iowa

Filed Dec. 29, 1955, Ser. No. 556,285

1 Claim. (Cl. 111—52)

My invention relates to a corn planter, and more particularly to corn planter attachments.

An object of my invention is to provide corn planter attachments which can be attached to a tractor, and wherein all portions of the corn planter can oscillate or rock freely in practically any direction, either longitudinally or laterally, to accommodate irregularities of the ground, ditches, etc.

A further object of my invention is to provide an arrangement in which either side of the arrangement will work individually with respect to the other side, or in other words, one side can be on smoother ground and the other side on rougher ground, etc.

A further object of my invention is to provide an arrangement in which shocks to any part of the mechanism will be readily absorbed.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 5 is a sectional view taken generally along the lines 5—5 of Figure 1,

Figure 6 is a sectional view taken generally along the lines 6—6 of Figure 1, and Figure 7 is an enlarged detail of one of the ball joints.

Figure 1:
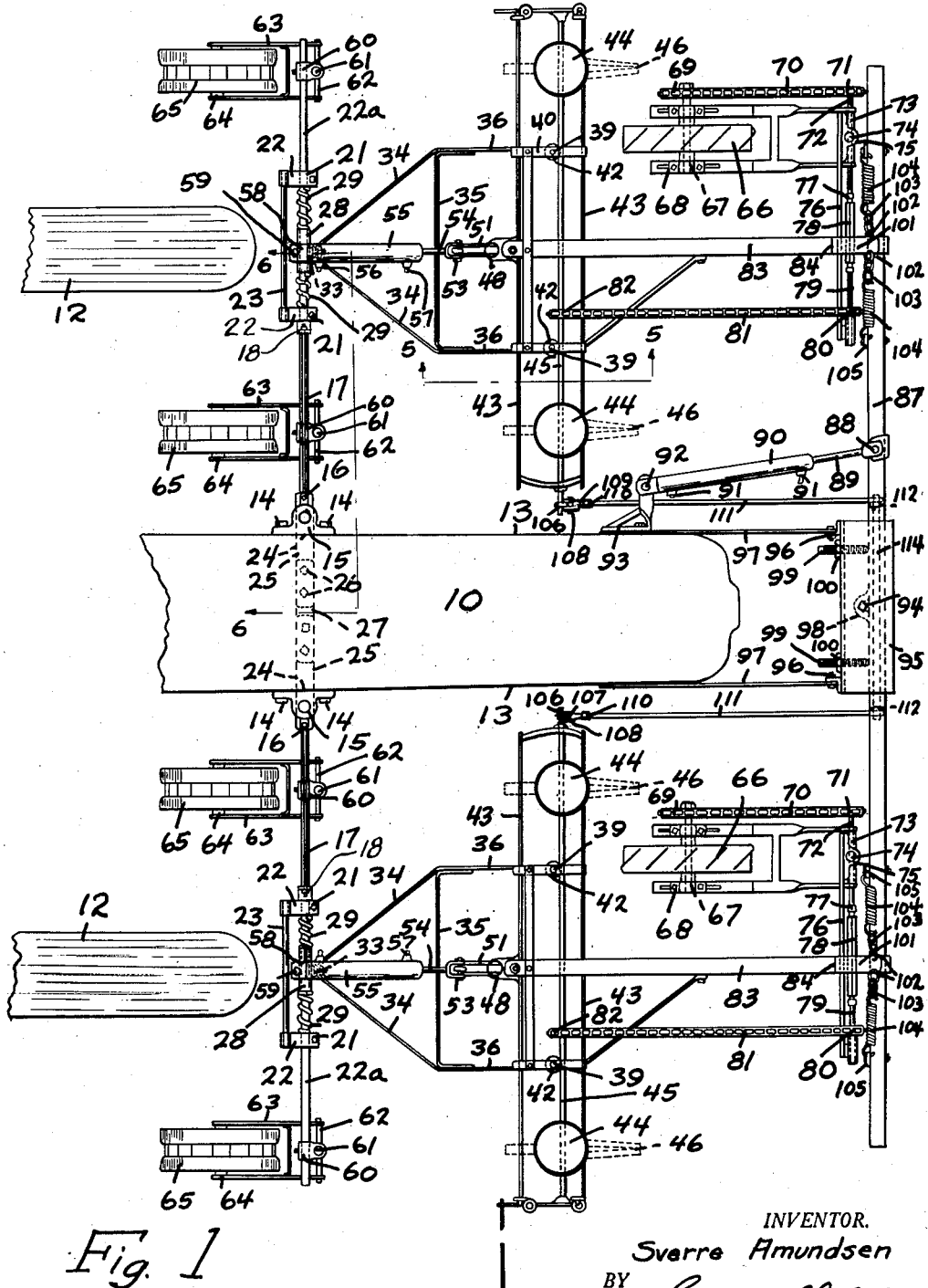
Figure 1 is a plan view of the forward portion of a tractor showing my device attached thereto with parts of the tractor broken away.

My invention relates to a corn planter as well as corn planter attachments.

I have used the character 10 to indicate the hood of a tractor, the character 11 the forward wheels, and the character 12 the rear wheels, the character 13 indicating the sides of the hood.

Bolted at 14 to the sides of the tractor are the brackets 15 to which are attached at 16 the rods 17 which are secured at 18 to the ears 19 (see Figure 6). Extending from the ears 19 are the portions 20 which are secured to the clamps 21, which clamps 21 include bracket portions 22 (see Figure 1) to which bracket portions 22 are attached the transverse bars 23. The clamps 21 clamp onto the square rods 22a which continue into the vertically positioned portions 23a which are secured in the members 15.

Attached to the portions 23 at 24 are the straps 25 which are bolted at 26 to further straps 27 which continue to the other side of the tractor in a similar arrangement as shown in Figure 1, Figure 6 showing one side of the arrangement, it being understood herein and throughout that the constructions will be practically the same on either side of the tractor.

Receiving the square rod 22a is a hollow square tube 28 against which bear the springs 29, the springs 29 bearing against the clamps 21, and attached beneath the hollow tube 28 (see Figure 5) are the clamps 31 having the split semi-spherical sections 32 for receiving the ball 33 which is attached to the diverging members 34 which in turn are attached to braces 35 and continue into the portions 36, which portions 36 are pivotally attached at 37 to the collars 38 which receive the vertically positioned rod 39 which passes through the frames 40 and 41, the coil springs 42 being interposed between the portions 40 and 41, and the collar 38 thereby providing resiliency to this portion of the unit, the character 43 indicating further conventional framework portions of standard planter units, the character 44 indicating the hoppers, the character 45 the actuating transverse rod which is rotatable to release the seed from the hoppers, the character 46 indicating the usual runners. Attached to the framework portion 41 are the extending portions 47 (see Figure 5), against which bears the spring 48 which receives the rod 49 pivotally attached at 50 to the framework 51 which is attached to the further bar 52 which is pivotally attached at 53 to the piston rod 54 which is attached to a suitable piston within the cylinder 55, the cylinder 55 having inlet openings at 56 and 57 to provide the actuation in either direction, the openings 56 and 57 being suitably connected to the hydraulic power supply of the tractor. The cylinders 55 are secured to ears 58 which are pivoted at 59 to continuing portions of the rods 23.

Secured by means of suitable clamps 60 to the rods 22a are the vertically positioned posts 61 which can be adjusted vertically, the posts 61 being attached to the transverse shafts 62 which are secured to the yokes 63 to which yokes are journalled at 64 the planter wheels 65 which are adapted to follow directly behind the furrow opening runners 46 to compress the soil and follow the row in the usual desired manner.

To drive the shaft 45 1 employ the weighted wheels 66 which are attached to the shafts 67 which are journalled in the portions 68, and attached to the shafts 67 are the sprockets 69 which engage the sprocket chains 70 which pass over the further sprockets 71 which are attached to the shafts 72. The portions 68 are attached to a transverse portion 73 in which the shafts 72 are journalled, and attached to the portion 73 is the vertical spindle 74 which can pivot in the bearings 75 which are secured to the pieces 76, and the shafts 72 are secured to the joints 77, which joints include shaft portions engaged with the substantially square hollow section 78, this arrangement thereby providing complete and free articulation of the wheels 66 so that as they pass through the field they can pivot and still provide the driving action, and further attached to the shaft portion 79 is a sprocket 80 over which passes the sprocket chain 81 which in turn engages the sprocket 82 (see Figure 1) which drives the planter shaft 45. This described arrangement therefore is freely articulated and also the wheels 66 will drive the planter unit, thereby not requiring separate drives of other types.

The principal supporting units of the planter members include the longitudinally positioned heavy straps 83, which straps (see Figure 2) extend into the vertical strap portions 84 to which strap portions 84 are attached the balls 85, suitably received in the ball joints 86, which joints 86 are rigidly clamped to the lengthened transverse bar 87, and pivoted to the bar 87 at 88 is the piston rod 89 including a suitable piston attached thereto which reciprocates within the hydraulic cylinder 90 having the inlet openings 91, these openings 91 being attached to suitable tubing which passes to the hydraulic arrangement of the tractor, the cylinder 90 being pivoted at 92 to the bracket 93 which is secured to one of the sides 13 of the tractor. The long bar 87 which is preferably square in cross section passes to both sides of the tractor as clearly shown in Figure 1, and is pivoted by means of a suitable bolt 94 to the U-shaped piece 95 which is bolted at 96 to the straps 97 which are suitably secured to the sides 13 of the tractor, the bolt 94 being slightly off-set from the bar 87 and passing through a suitable boss 98, which is enclosed by the top and bottom of the member 95. Set screw members 99 are threadedly engaged with the member 95 and include the locking nuts 100 to provide means whereby the transverse bar 87 can be adjustably locked in adjusted position whenever such is desired.

The vertical strap portion 84 continues into a further horizontal portion 101 (see Figure 2) to which are secured at 102 the chains 103 which are secured to springs 104, which springs 104 are in turn secured to the upper ends of the vertical straps 105 which straps are secured to the bar 87, this arrangement providing means whereby when the planter unit is raised, the springs will maintain an even balance to the units and a resilient balance as well.

It will be appreciated that for supporting the planter assemblies, there are provided two frame units, a forward frame unit and a rearward frame unit. The forward frame unit in each case consists essentially of the strap 83 which includes at its rearward end the vertically spaced frame elements 40 and 41 carrying therebetween the vertical rod 39. The rearward frame unit includes the forwardly divergent frame elements 34 terminating at their forward ends in the portions 36 and which are pivoted as at 37 to the collars 38 on the rods 39. The forward end of the forward frame unit is, of course, articulated to the bar 87 by means of the ball and socket means 85—86 and the rearward end of the rearward unit is pivoted in each case to a corresponding horizontal rod 22a by means of the ball and socket means 32—33 carried in part by the hollow tube 28 which is laterally slidable on each rod 22a.

Figure 3:
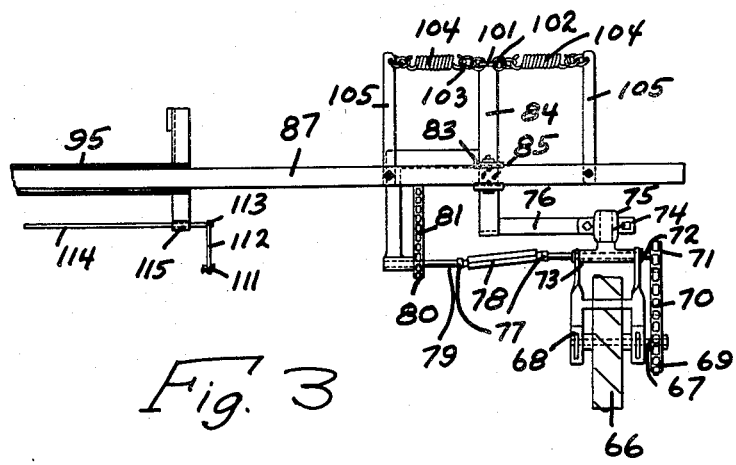
Figure 3 is a forward elevation of a portion of Figure 2.
Figure 4:
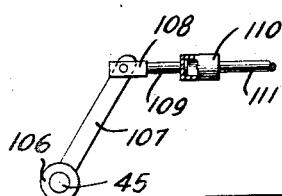
Figure 4 is a detail of a portion of the synchronizing arrangement.

Secured to the inner ends of the planter shafts 45 at 106 (see Figure 4) are the arms 107 which are pivoted to small U-shaped members 108 which extend into the portions 109 having enlarged heads which are freely revoluble in the hollow collars 110 to provide articulation at this point, the collars 110 being secured to the rods 111 (see Figure 4), which rods 111 are secured to further arms 112 (see Figure 3) which are secured at 113 to a centrally positioned transverse shaft 114 journalled at 115, the shaft 114 passing in identical manner to the other side to a similar arrangement so that in effect the tripping action at the planters on either side of the tractor will be uniform and positive during the operation of the machine.

Figure 2:
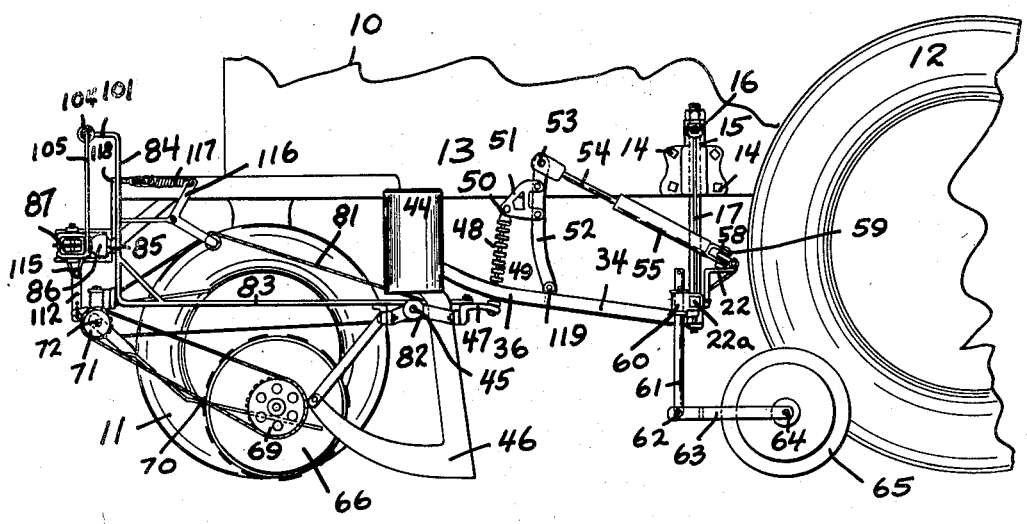
Figure 2 is a side elevation of Figure 1, with parts removed and parts of the tractor broken away.

Figure 2 illustrates an arrangement in which an idler member is used to maintain the sprocket chain 81 in tautened condition including the bell crank element 116 secured to the spring 117 which is secured to the bracket 118 which is suitably secured to the transverse member 76, this arrangement not being shown in Figure 1 for clarity.

When it is desired to raise the planter units from ground-engaging position, the hydraulic cylinders 55 are operated in such a manner so that the cylinders therein will pass to the left as observed in Figure 2, which due to the pivotal connections at 54 and 119 will raise the entire framework 36 etc. which will in turn raise the complete planter framework, however, during normal operation the springs 42 will provide a completely resilient effect as the planter travels through the field, the same also applying to the springs 48. The ball joints at 33 permit lateral or vertical movement of the entire planter structure, the springs 29 also permitting a spring mounted resilient action, so that in effect a complete articulation is provided. Also, as explained hereinabove, the wheels 66 are completely articulated as well as the driving elements connected to the wheels, so that a loose and articulate movement is also provided at these points during operation.

In case the tractor passes along a hillside and it is desired to equalize the tractor rear wheels with the forward portion of the planter so that the tractor will travel in a straight line, the bar 87 is pivoted at the bolt 94 by merely forcing oil into the cylinder 90 in the proper direction until the equalization is effected, and in many cases the arrangement can be locked by the members 99. The ball joints at 85 also permit the entire arrangement to be completely articulated in vertical or horizontal motions or at any angles, so that as a result a completely flexible planter unit is provided, and it will be observed from the construction that the unit can also be readily attached to or detached from a tractor. Other standard portions of the planter units are not specified since they are of the usual construction. The springs 104 during operation or after raising also provide a complete resilient action to all of the attendant parts.

It will now be noted that I have provided the various advantages mentioned in the objects of my invention with further advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A corn planter assembly comprising brackets for attachment to the sides of a tractor, laterally extending generally horizontal rods attached to said brackets such that said rods extend outwardly from the opposite sides of the tractor, a bracket for attachment to the forward end of the tractor, a horizontal bar pivotally attached to the last mentioned bracket about a vertical axis substantially intermediate the ends of the bar with the bar extending on opposite sides of the tractor generally parallel with said rods, a hydraulic piston and cylinder assembly for attachment at one end to the tractor and its opposite end being connected to said bar remote from its pivot axis to selectively pivot the bar, a forward frame unit disposed on each side of the tractor including a strap disposed generally parallel thereto, ball and socket means articulating the forward end of each strap to said bar, each forward frame unit also including vertically spaced frame members rigid with the rearward portion of each strap, a corn planter unit including a hopper and a furrow opener mounted on each strap, a rearward frame unit disposed on each side of the tractor, each rearward frame unit including frame elements extending forwardly from an associated horizontal rod and terminating at their forward ends in the region of the rearward ends of an associated one of said forward frame units, a vertical rod carried between said vertically spaced frame elements of each forward frame unit, a collar on each vertical rod and spring means bearing between the vertically spaced frame elements and the opposite sides of each collar resiliently positioning the collar between the vertically spaced frame elements, means pivotally connecting the forward ends of each rearward frame unit to an associated collar to provide resilient articulation between the forward and rearward frame units, a hollow tube slidably embracing each of said horizontal rods, spring means carried by each horizontal rod and bearing against opposite sides of each hollow tube to resiliently position the same upon the horizontal rods, ball and socket means articulating the rearward portion of each rearward frame unit to an associated hollow tube, and a piston and cylinder assembly connected at its opposite ends between each horizontal rod and the associated rearward frame unit to effect vertical movement of the latter.

References Cited in the file of this patent
UNITED STATES PATENTS

| | | |
|---|---|---|
| 1,103,350 | Corkhill | July 14, 1914 |
| 1,811,041 | Dennis | June 23, 1931 |
| 1,960,268 | Kriegbaum | May 29, 1934 |
| 2,263,128 | Hale | Nov. 18, 1941 |
| 2,593,679 | Kaupke | Apr. 22, 1952 |
| 2,656,776 | Cox et al. | Oct. 27, 1953 |
| 2,771,043 | Carlson | Nov. 20, 1956 |